United States Patent
Schwindt

(10) Patent No.: US 11,597,533 B2
(45) Date of Patent: Mar. 7, 2023

(54) FLIGHT MANAGEMENT SYSTEM AND METHOD OF UPDATING FLIGHT CALCULATIONS

(71) Applicant: GE Aviation Systems Limited, Cheltenham (GB)

(72) Inventor: Stefan Alexander Schwindt, Cheltenham (GB)

(73) Assignee: GE Aviation Systems Limited, Cheltenham (GB)

( * ) Notice: Subject to any disclaimer, the term of this patent is extended or adjusted under 35 U.S.C. 154(b) by 14 days.

(21) Appl. No.: 16/679,537

(22) Filed: Nov. 11, 2019

(65) Prior Publication Data
US 2020/0148381 A1 May 14, 2020

(51) Int. Cl.
*B64D 45/00* (2006.01)
*G06F 16/903* (2019.01)
*G08G 5/00* (2006.01)

(52) U.S. Cl.
CPC ........... *B64D 45/00* (2013.01); *G06F 16/903* (2019.01); *G08G 5/006* (2013.01); *G08G 5/0013* (2013.01); *G08G 5/0039* (2013.01)

(58) Field of Classification Search
CPC .... B64D 45/00; G06F 16/903; G08G 5/0013; G08G 5/0039; G08G 5/006; G08G 5/0078; G08G 5/0082; G08G 5/0091; G08G 5/0021; G08G 5/0026; G08G 5/0008; G08G 5/0043; G08G 5/0095; G08G 5/0004
See application file for complete search history.

(56) References Cited

U.S. PATENT DOCUMENTS

| | | |
|---|---|---|
| 6,177,888 B1 | 1/2001 | Cabot et al. |
| 6,963,291 B2 | 11/2005 | Holforty et al. |
| 8,000,848 B2 | 8/2011 | Baranov et al. |
| 8,362,925 B2 | 1/2013 | Brinkman et al. |
| 9,564,055 B2 | 2/2017 | Shipley et al. |
| 9,709,698 B2 | 7/2017 | Nykl et al. |
| 10,809,743 B1 * | 10/2020 | McCusker ............ B64D 45/00 |
| 10,876,857 B1 * | 12/2020 | Kanagarajan ........ G08G 5/0091 |

(Continued)

FOREIGN PATENT DOCUMENTS

| | | |
|---|---|---|
| WO | 2007115359 A1 | 10/2007 |
| WO | 2008094192 A2 | 8/2008 |

OTHER PUBLICATIONS

Flight Crew Guide cockpit reference codex, "Strategic Lateral Offset Procedures (SLOP)" [online] date: Jun. 4, 2018; URL>https://web.archive.org/web/20180604152206/http://flightcrewguide.com:80/wiki/rules-regulations/strategic-lateral-offset-procedures-slop/ retrieved:Apr. 7, 2021 (Year: 2018).*

(Continued)

*Primary Examiner* — Shon G Foley
(74) *Attorney, Agent, or Firm* — McGarry Bair PC

(57) ABSTRACT

A method and apparatus for recording flight information of aircraft, such as position, mass, or type, in order to record the position of a wake turbulence of the aircraft. Weather information can be recorded as affecting the wake turbulence. Such information can be provided into a model or algorithm to determine a path of a wake turbulence. An aircraft on a flight path to encounter the wake turbulence can determine a vortex magnitude of the wake turbulence and determine if an advisory alert needs to be provided if the vortex magnitude satisfies a predetermined threshold.

22 Claims, 5 Drawing Sheets

(56) References Cited

U.S. PATENT DOCUMENTS

| | | | |
|---|---|---|---|
| 2003/0222795 A1* | 12/2003 | Holforty | B64D 43/00 |
| | | | 340/968 |
| 2008/0035784 A1* | 2/2008 | Meserole | G08G 5/0013 |
| | | | 244/3.1 |
| 2012/0022724 A1* | 1/2012 | Botargues | G05D 1/1062 |
| | | | 701/8 |
| 2014/0118188 A1 | 5/2014 | Khatwa et al. | |
| 2016/0093224 A1 | 3/2016 | Pereira | |
| 2016/0217694 A1* | 7/2016 | Batla | G08G 5/0013 |
| 2016/0328981 A1 | 11/2016 | Herder | |
| 2017/0045615 A1* | 2/2017 | Martin | B64F 1/36 |
| 2018/0247542 A1* | 8/2018 | Koduru | G01S 13/953 |
| 2019/0228665 A1* | 7/2019 | Bosworth | H04L 67/104 |

OTHER PUBLICATIONS

European Patent Office, Extended Search Report re Corresponding Application No. 19206678.5-1203, dated Apr. 24, 2020, 10 pages, Munich, Germany.

* cited by examiner

FLIGHT MANAGEMENT SYSTEM AND METHOD OF UPDATING FLIGHT CALCULATIONS

CROSS REFERENCE TO RELATED APPLICATION(S)

This application claims priority to and benefit of U.K. Patent Application No. 1818376.4 filed Nov. 12, 2018, which is incorporated herein in its entirety.

TECHNICAL FIELD

The disclosure relates to a method and flight management system for flying an aircraft in accordance with vortex effects.

BACKGROUND

Aircraft, when flying, generate wake turbulence from the wings. The wake turbulence can form vortical airflows that remain behind or in the wake of the aircraft. The wake turbulence is generally subject to environmental conditions, such as weather, wind, other local air turbulence, pressure, the Coriolis Effect, temperature, or other environmental conditions, which can affect dissipation rates of the turbulence vortices.

The wake turbulence generated by the aircraft can be dangerous to other aircraft in the area or trailing behind. The magnitude of the wake turbulence can be function of aircraft speed, size, and generated lift. Particularly, larger aircraft create larger wake turbulences. Therefore, wake turbulences from larger aircraft have a larger magnitude, which can be problematic to small aircraft.

BRIEF SUMMARY

In one aspect, the disclosure relates to a method of updating flight calculations, the method comprising: flying an aircraft along a current flight path; automatically collecting aircraft traffic information including at least one of aircraft position, type, mass, or mass category from at least one of a network of aircraft operating in a nearby region or a ground station; automatically collecting real-time weather data; predicting at least one vortex with a vortex magnitude to be encountered by the current flight path; comparing the vortex magnitude to a predetermined threshold for the aircraft; determine if the vortex magnitude satisfies the predetermined threshold based on the comparing to indicate the vortex magnitude interferes with the current flight path; and automatically initiating at least one of an advisory alert on a system of the aircraft or displaying, on an aircraft flight display, a suggested alternative flight path if the vortex magnitude satisfies the predetermined threshold.

In one aspect, the disclosure relates to a flight management system, comprising: a receiving module configured to receive real-time weather data and configured to receive aircraft traffic information including at least one of aircraft type, mass, or mass category from at least one of a network of aircraft operating in a nearby region or a ground station; a routing module for predicting at least one vortex with a vortex magnitude to be encountered by a current flight path of an aircraft based on the real-time weather data and the air traffic information and determining if the vortex magnitude satisfies a predetermined threshold; and an advisory module configured to provide a display output based on the determining including at least one of an advisory alert on a system of the aircraft or displaying, on an aircraft flight display, a suggested alternative flight path.

DETAILED DESCRIPTION

Figure 1:
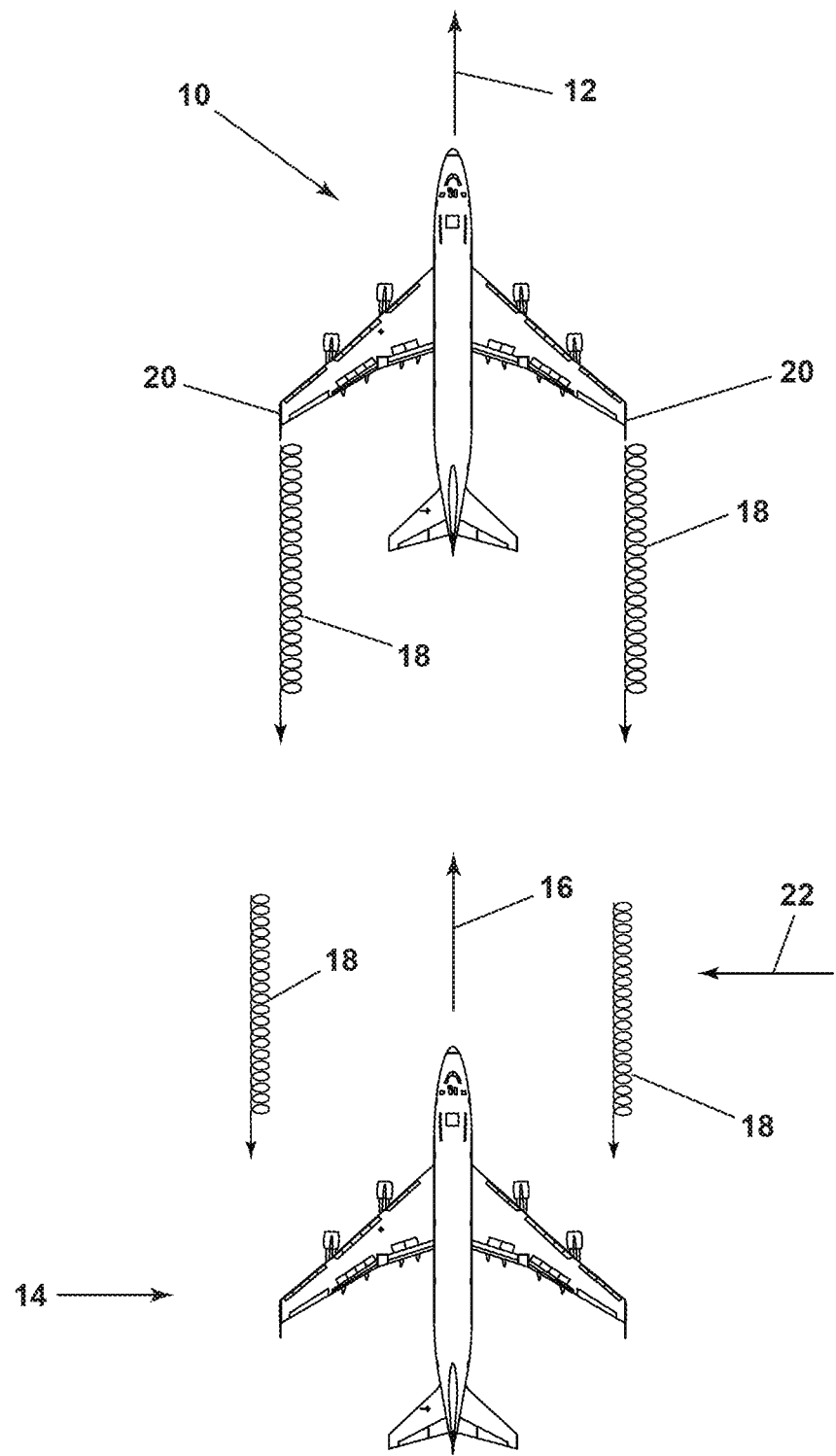
FIG. 1 is a schematic top view of an aircraft generating a wake turbulence vortex and another aircraft encountering the vortex.

Aspects of the present disclosure relate to a system and method for recording, monitoring, reporting, and communicating aircraft wake turbulence vortices, as well as a method updating flight calculations or a flight path in view of generated wake turbulence vortices. Additionally, the description will be described in reference to four-dimensional (4D) space and points in 4D space, which include a longitude, a latitude, an altitude, as well as a time dimension.

As used herein, the term "forward" or "upstream" refers to moving in a direction toward the front of an aircraft, or a component being relatively closer to the front of the aircraft as compared to another component. The term "aft" or "downstream" used in conjunction with "forward" or "upstream" refers to a direction toward the rear of the aircraft or being relatively closer to the rear of the aircraft as compared to another component. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another, while can be in communication with one another. The exemplary drawings are for purposes of illustration only and the dimensions, positions, order, and relative sizes reflected in the drawings attached hereto can vary. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

As used herein, a "flight management system" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

The term "satisfies" with respect to a threshold value is used herein to mean that a sensed, measured, or determined value is equal to or greater than the threshold value, or being within a threshold value range (e.g. within tolerance). It will be understood that such a determination may easily be altered to be satisfied by a positive/negative comparison or a true/false comparison.

Referring now to FIG. 1, a first aircraft 10 is illustrated as flying along a first flight path 12 in front of a second aircraft 14, which is illustrated as flying on a second flight path 16 that encounters or overlaps at least a portion of the first flight path 12. While shown that the first aircraft 10 is flying immediately in front of the second aircraft 14, it should be understood that FIG. 1 is a schematic view, and that the second aircraft 14 can be a larger distance behind the first aircraft 10, such as several nautical miles, or more. Similarly, while the first flight path 12 and second flight path 16 are illustrated with arrows pointed in the same direction it will be understood that they need only overlap at some point and that the first flight path 12 and second flight path 16 need not be identical.

During flight, the first aircraft 10 generates a wake turbulence formed as a vortex(es) 18 formed behind each wing tip 20. Each vortex 18 remains within an airspace after being generated by the aircraft 10, shown as a second set of spaced vortices 18 downstream of the first vortices 18 adjacent the first aircraft 10. The vortex(es) 18 can be formed as a substantially vortical flow, being tightly wound. The magnitude of the vortex 18 can be a function of the aircraft type, size, and speed, as well as a function of the lift generated by the aircraft 10, while the magnitude of the vortex 18 can be partially mitigated by wing improvements to reduce any lift induced drag. Thus, larger aircraft requiring a greater amount of lift typically generate a larger, more intense vortex 18 as compared with that of a smaller aircraft. Such larger aircraft can include A350, A380, B777, or B787 in non-limiting examples. Additionally, the vortex 18 can be affected by environmental conditions 22, such as weather, temperature, pressure, wind, the Coriolis Effect or rotation of the Earth, or other regional effects or conditions the vortex 18 may encounter. Such environmental conditions 22 can move the position of the vortex 18 generated by the first aircraft 10, and increase dissipation, while the vortex 18 would otherwise stay generally stationary and slowly dissipate. As shown in FIG. 1, the vortices 18 adjacent the second aircraft 14 are slightly smaller and aligned slightly to the left, which can represent a dissipation and movement of the vortices 18 over time and as a result of the environmental conditions 22.

In order to operate the second aircraft 14 in view of the vortices 18 generated by the first aircraft 10, the second aircraft 14 can be appropriately spaced behind the first aircraft 10, such that suitable vortex dissipation has occurred by the time the second aircraft 14 encounters the vortices 18. However, such spacing limits the capacity of air traffic travelling within an airspace; this can be particularly true and problematic near an airport where traffic is heavy.

Alternatively, the second aircraft 14 can avoid the vortex 18, such as by flying around the vortex 18. One example is spacing the aircraft 10, 14 into flight lanes, which can be flight paths spaced 1-3 nautical miles to the side of one another. However, this option can require the second aircraft 14 to fly a suitable distance away from a desired flight path to ensure avoidance of the vortex 18, which can complicate flight traffic patterns, such as those in busy areas near airports. Additionally, this option has a negative impact on specific fuel consumption of the second aircraft 14, as more fuel expenditure is required to alter the flight path to avoid the vortex 18, and this can also increase overall flight times.

Figure 2:
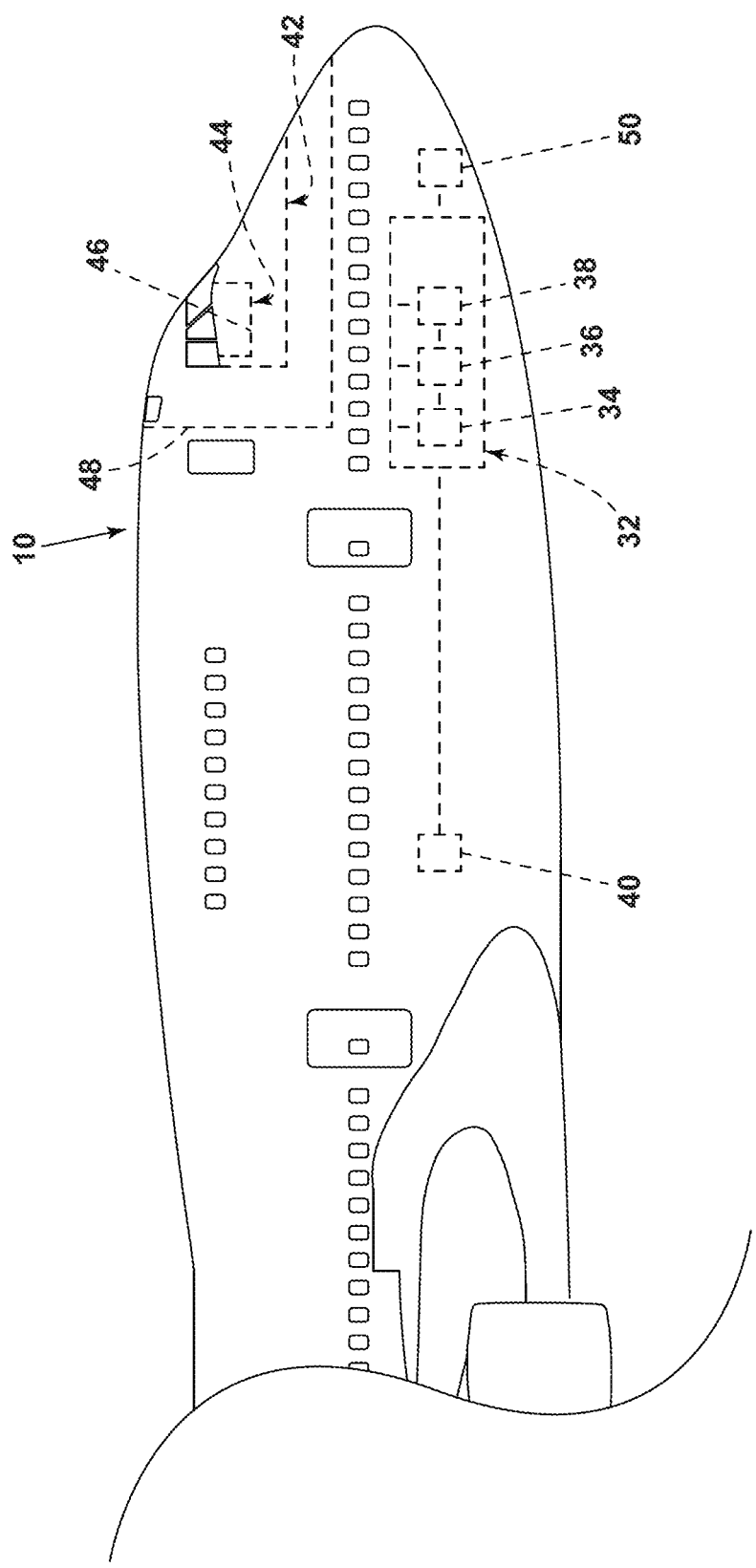
FIG. 2 is an enlarged side view of a portion of an aircraft including a flight management system.

Referring now to FIG. 2, the aircraft 10, which can form either the first aircraft 10 or the second aircraft 14, can include a flight management system 32 with a receiving module 34, a routing module 36, and an advisory module 38. The flight management system 32 is illustrated as being integrated into the electronics and control system of the aircraft 10. The flight management system 32 provides for control of the aircraft systems, as well as communication between the aircraft and external sources, such as ground control, Air Traffic Control, or other aircraft. The flight management system 32 can utilize information measured or received to the aircraft 10 to operate the aircraft 10 utilizing such information. Additionally, the flight management system 32 can control on-board systems of the aircraft 10, such as electrical power, for example. Alternatively, it is contemplated that the flight management system 32 or portions thereof can be remote of the aircraft 10 and in communication with the aircraft 10 via a communication link 50.

The receiving module 34 can provide for bidirectional communication for the aircraft 10, such as for sending or receiving information via the communication link 50. In order to be capable of wirelessly linking with other systems and devices, the communication link 50 can include, but is not limited to, packet radio including data transmission over high frequency (HF) and very high frequency (VHF) ranges, satellite uplink, Wireless Fidelity (WiFi), WiMax, AeroMACS, Bluetooth, ZigBee, 3G wireless signal, code division multiple access (CDMA) wireless signal, global system for mobile communication (GSM), 4G wireless signal, long term evolution (LTE) signal, Ethernet, or any combinations thereof. It will also be understood that the particular type or mode of wireless communication is not critical to embodiments of this invention, and later-developed wireless networks are certainly contemplated as within the scope of embodiments of this invention. Such information communicated to the receiving module 34 via the communication link 50 can include real-time weather data, such as that recorded by the aircraft 10, and aircraft traffic information. Aircraft traffic information can include, for example, aircraft 4D position, aircraft type, aircraft weight or mass, aircraft mass category, aircraft lift, aircraft speed, or aircraft flight path in non-limiting examples. The receiving module 34 can be configured to automatically query information sources in communication with the aircraft 10 for the weather data or the aircraft traffic information.

A sensor 40, for example, can be provided on the aircraft 10 for making measurements to record any such information, transmittable by the receiving module 34, such as local, real-time weather conditions or real-time weather data, temperature, pressure, regional effects, such as terrain or ground height relative to sea level, or aircraft traffic information such as aircraft speed or lift. Furthermore, the receiving module 34 can send or receive information related to a vortex, such as a position of the vortex generated by the aircraft 10 based upon the aircraft's flight path, a position of a vortex in airspace generated by another aircraft, or a vortex magnitude.

The routing module 36 can provide for storing, mapping, predicting, or otherwise determining a flight path for the aircraft 10. The routing module 36 can further compare the determined flight path with the position of a vortex, as well as with the flight path of other aircraft within the same local airspace where a future vortex may or will exist based upon the current flight path of the other aircraft. Additionally, the routing module 36 can determine the vortex magnitude of the vortex that the aircraft 10 may encounter based upon information received at the receiving module 34. The routing module 36 can also determine whether the vortex magnitude satisfies a predetermined threshold magnitude. Such a predetermined threshold magnitude can be based upon a vortex magnitude deemed too great for the aircraft 10 to traverse based upon the specific aircraft 10. Such specifications of the aircraft can include size, mass, weight, or speed, in non-limiting examples.

The advisory module 38 can be configured to send a signal or otherwise provide or display an output including but not limited to a display output. By way of non-limiting example this can include that the advisory module 38 can provide an audible or visual alert or display an alternative flight path for the aircraft 10. For example, the advisory module 38 could output a signal to an alert system 42 of the aircraft 10 or an aircraft flight display 44, such as a cockpit display 46 within a cockpit 48 of the aircraft 10. In one example, the display output can be an advisory alert that is displayed, advising of the time of traversal, 4D position, or magnitude of a vortex. An advisory alert can be a warning, for example, or could be a suggested alternative flight path. Alternatively, the display output can be provided to a display remote of the aircraft 10, such as at ground station or Air Traffic Control, for example.

Figure 3:
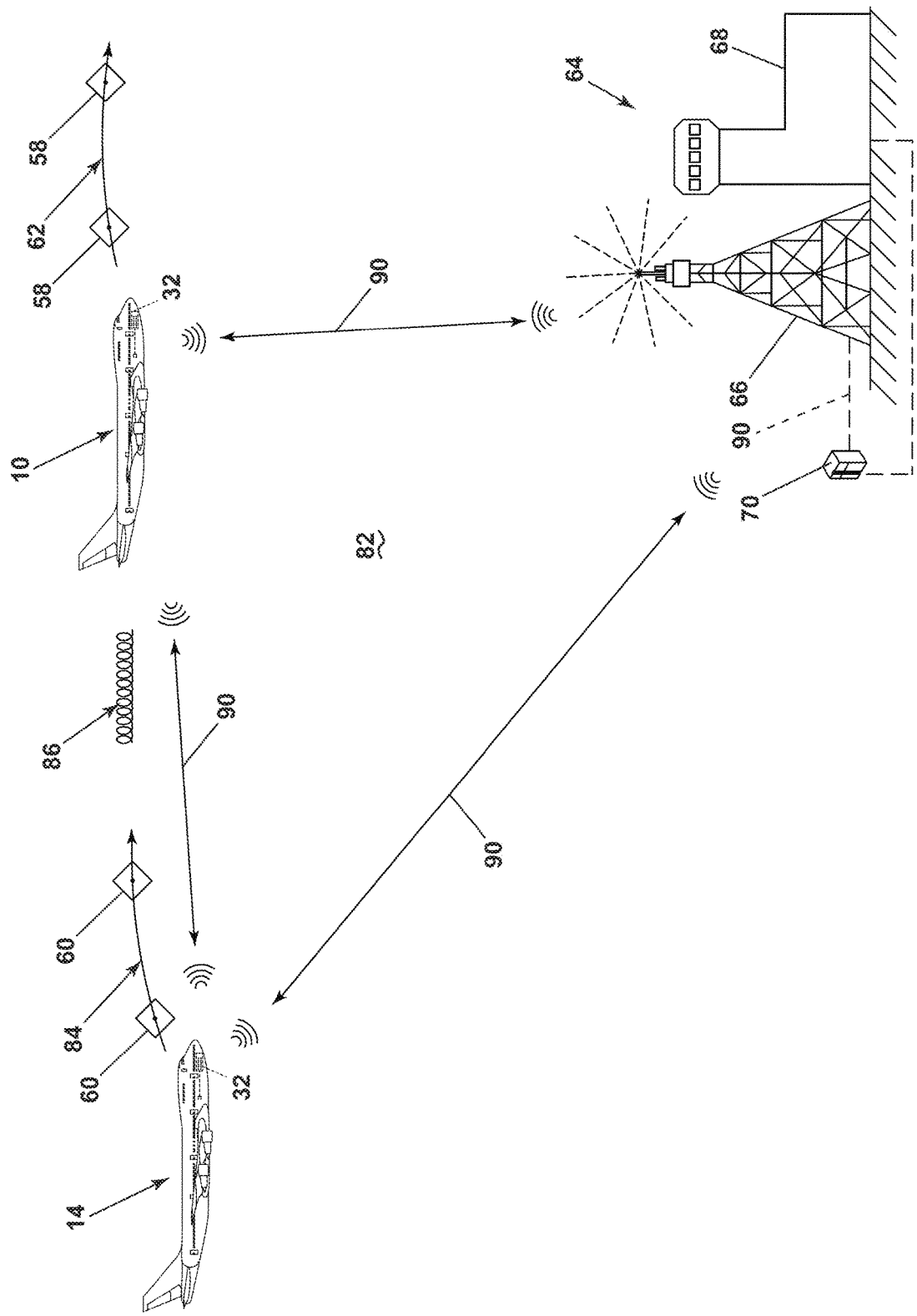
FIG. 3 is a schematic side view of a communication system for reporting and communicating a vortex generated by an aircraft between a ground station and another aircraft.

Referring now to FIG. 3, the first aircraft 10 can fly along a trajectory in 4D space, indicated by the diamond-shaped points 58 to define a first flight path 62 or a current flight path subject to change. The flight path 62 can terminate at an airport, for example. A ground station 64 including a control tower 66 and Air Traffic Control 68 can be in communication with the first and second aircraft 10, 14. The ground station 64 need not be at an airport, but can be at any suitable location for communication with one or more aircraft. Additionally, a remote server 70 can be in communication with the ground station 64 or Air Traffic Control 68. Further, it is contemplated that the server 70 can be in direct communication with one or more aircraft.

The first aircraft 10 can fly within an airspace common to the second aircraft 14. As described above this is particularly common at aircraft hubs like airports but the airspace with common aircraft is not limited to airports. Such an airspace with common aircraft can define a network of aircraft operating within a nearby region 82 or airspace, or local to the ground station 64. In one example, the nearby region 82 can be within 100 miles of the current flight path of the first aircraft 10. It is further contemplated that the nearby region 82 need not be local to the ground station or geographically restricted, but can encompass the totality of aircraft flying within a large geographical region, such as within a state, a country, hemisphere, or the entirety of the globe. The aircraft contained within the nearby region 82 can define the network of aircraft, including one or more aircraft flying along a flight path within or partially within the nearby region 82. Additionally, the network of aircraft can include Air Traffic Control 68, ground stations 64, control towers 66, or any other source of communication during flight of the aircraft within the nearby region 82, such that the network need not be limited to aircraft alone.

The first aircraft 10 generates the wake turbulence 18 as a vortex 86. The second aircraft 14 can fly along another or second flight path 84, shown with 4D points 60, which can encounter the vortex 86. The flight path 62 of the first aircraft 10 can intersect the flight path 84 of the second aircraft 14, such that the second aircraft 14 encounters the vortex 86 generated by the first aircraft 10. Therefore, based upon the magnitude of the vortex 86 it may be desirable for the first aircraft 10 to avoid the vortex 86, or indicate the time and magnitude of encountering the vortex 86 if not avoiding the vortex 86.

The first aircraft 10, the second aircraft 14, the ground station 64, and the remote server 70 can all have communication capabilities, each being capable of communicating with each other. The first aircraft 10, the second aircraft 14, the ground station 64, and the remote server 70 can communicate via any suitable type of wireless signal including but not limited to any radio signals, cellular signals, satellite communication, wireless internet communication, or combinations thereof. In this way, the aircraft 10, 14, ground stations 64 or system in communication within the nearby region 82 can form a communication network 90. Via the communication network 90, all aircraft operations along the flight path 62 or near the flight path 62 of the first or second aircraft 10, 14 can be communicated among the elements in the nearby region 82. Such aircraft operations can include flight information, such as flight paths, travel times, speed, aircraft information like size or mass, as well as additional information such as weather conditions. The communication network 90 between these elements can form a mesh network, for example, with intercommunication occurring between all of the elements in the network 90, and can include unidirectional, bidirectional, or multi-directional communication between one or more systems over the communication network 90, based upon the specific capabilities of the particular system. For example, the first aircraft 10 can be in communication with the second aircraft 14, the ground station 64, and the remote server 70 simultaneously. The mesh network can partially form or be a part of a System Wide Information Management (SWIM) network, which can be the totality of communication among multiple aircraft, airlines, airports, control towers, servers, or any other source of information or flight analysis.

Utilizing the communication network 90, the first aircraft 10 travelling along the first flight path 62 can record the position of the vortex 86 generated, as well as information specific to the vortex 86, such as turbulence magnitude along the first flight path 62. Additionally, the first aircraft 10 can simultaneously and continuously record local conditions along the first flight path 62, such as environmental or weather conditions, such as temperature, wind speed, weather, storms, pressure, or other factors that can affect the vortex 86. Furthermore, the first aircraft 10 can simultaneously and continuously record flight information of the first aircraft 10, such as 4D position, aircraft speed, aircraft size, aircraft weight, lift generated, or any other information related to the first aircraft 10 which may have a bearing on the position, movement, dissipation, or magnitude of the vortex 86.

The communication network 90 can receive the totality of information recorded by the first aircraft 10 as a data set, which can be communicated to one or more other elements in communication along the communication network 90, such as the second aircraft 14 or the ground station 64, or receiving modules 34 contained therein. The data set can be analyzed and factored into a model operated within the flight management system 32; or more particularly, within the routing module 36 contained therein. The routing module 36 can contain a set of executable instructions that can include the model, which can utilize the data set information communicated from the communication network 90 to enter into the model. For example, the receiving module 34 of the flight management system 32 can receive the data set information and send it to the routing module 36 for entering the information into the model. The routing module 36 can utilize the model to record the position of the vortex 86, as well as predict the path of the vortex 86 as effected by the environmental factors. In this way, the model can represent the 4D path and position of the vortex 86 recorded in the flight management system 32. In this way, the second aircraft 14 can be warned before encountering the vortex 86 or can alter a flight path to avoid the vortex 86 prior to encountering the vortex 86. Furthermore, the routing module 36 can utilize the data set or the model to determine a vortex magnitude for the vortex 86 when the second aircraft 14 will encounter the vortex 86, which can be used to determine if the vortex magnitude satisfies a predetermined threshold. Such a vortex magnitude can be subject to environmental factors and anticipated dissipation of the vortex 86 over time. If the predetermined threshold is satisfied, such as if the magnitude exceeds the threshold, the advisory module 38 can display a display output based upon the determination, and can include an advisory alert, or a suggested alternative flight path to avoid the vortex 86.

In this way, the flight management system 32 of the aircraft can model the position and path of the vortex 86 with the routing module 36, while it is contemplated that remote systems, such as that of the control tower 66 or the remote server 70 can perform such modelling, as the computing power of the flight management system 32 within the aircraft 10 may be limited. Additionally, historical data can be stored at the remote server 70, which can be used to develop and improve future models utilizing the historical data.

Figure 4:
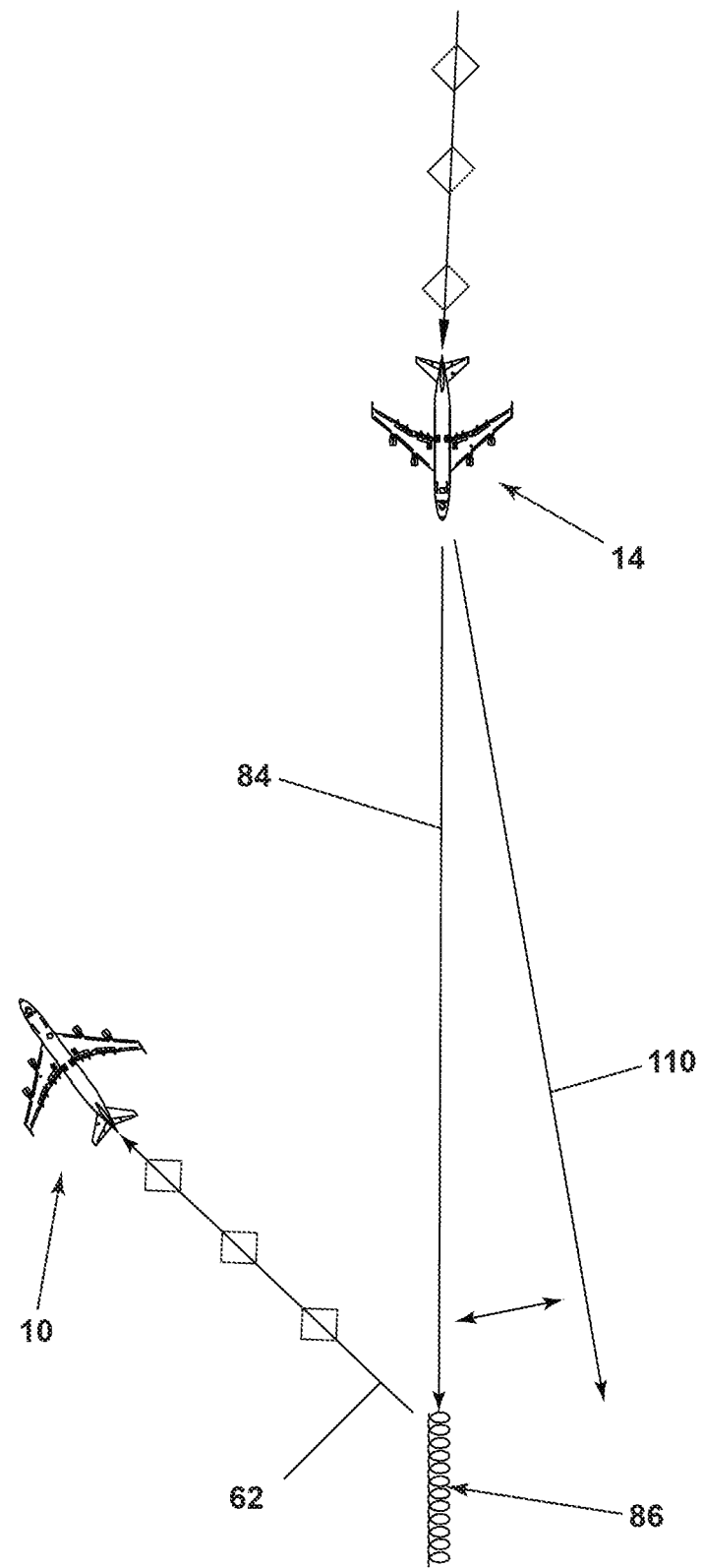
FIG. 4 is a schematic diagram of altering a flight path based upon a generated vortex.

Referring now to FIG. 4, the first aircraft 10 follows the first flight path 62 and generates the wake turbulence vortex 86. The second aircraft 14 follows the second flight path 84, which can be on a path that encounters the vortex 86 of the first aircraft 10.

The first aircraft 10 can generate and record information related to the generation, magnitude, position, and movement of the vortex 86, and can form the model determine the position, path, and magnitude of the vortex 86. Alternatively, such information can be transmitted from the first aircraft 10 and received by the second aircraft 14 at a receiving module, where the second aircraft 14 can model the vortex 86 in a routing module. In another example, the information can be provided to a ground station, control tower, or Air Traffic Control to perform modelling and management of the vortex 86. Based upon the magnitude or intensity of the modeled vortex 86, the second aircraft 14 can determine if the vortex magnitude satisfies a predetermined threshold for the vortex magnitude specific to the second aircraft 14. If the vortex magnitude satisfies the predetermined threshold for the second aircraft 14, the second aircraft 14 can take appropriate action to avoid the vortex 86. For example, if the first aircraft 10 is small aircraft and the second aircraft 14 is a large aircraft, the vortex 86 may have only a small effect on the second aircraft 14, such as minor turbulence. In this example, avoidance may not be needed, as the vortex 86 may not satisfies the predetermined threshold. However, a warning to the second aircraft 14, such as an indication from the advisory module may be beneficial, such as an instruction to put on seat belts and remain seated.

However, if the first aircraft 10 is a large aircraft and the second aircraft 14 is a small aircraft, the vortex 86 can have a detrimental effect on the second aircraft 14 and avoidance is likely required. In this example, avoidance, such as a Strategic Lateral Offset Procedure (SLOP) 110 can be executed by the second aircraft 14 to avoid the vortex 86, moving the second aircraft 14 to a 4D lateral position that will not encounter the vortex 86. Additional avoidance maneuvers can be taken, such as an alternative flight path, a new flight path, an increase or decrease in altitude, or moving to another flight lane, typically spaced to the side of the first flight path 62 of the first aircraft 10 as a separate flight lane. Such a flight lane, for example, can be a flight path arranged substantially parallel to the initial flight path or lane.

Figure 5:
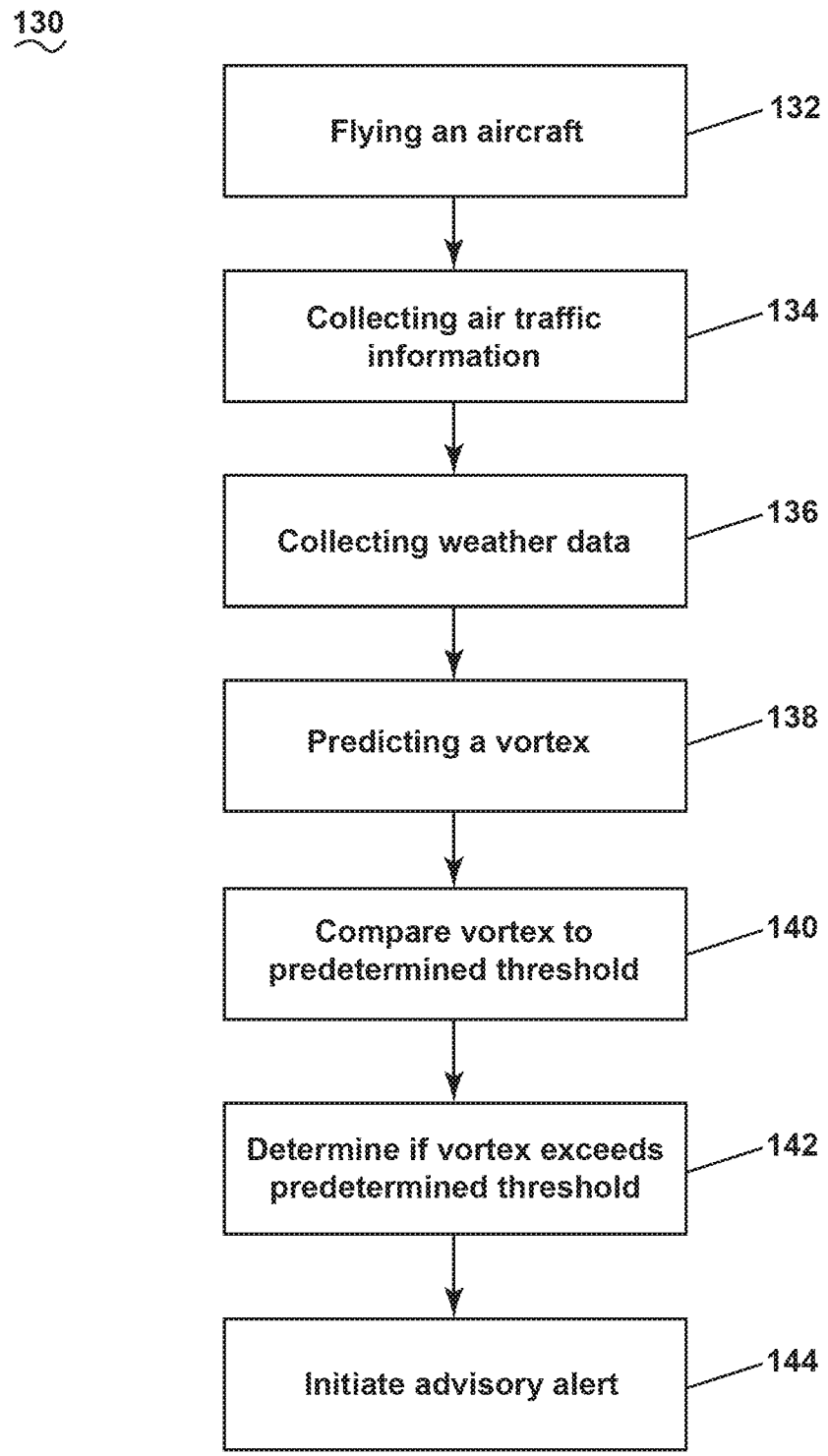
FIG. 5 is a flow chart diagram illustrating a method of updating flight calculations.

Referring now to FIG. 5, a method 130 of updating flight calculations can include: at 132, flying an aircraft 14 along a current flight path 84; at 134, automatically collecting aircraft traffic information including at least one of aircraft position, type, mass, or mass category from at least one of a network 90 or aircraft 10 operating in a nearby region 82 or a ground station 64.

At 136, real-time weather data can be automatically collected, such as with the receiving module 34. At 136, collecting real-time weather data can include at least one of wind direction, turbulence levels in the atmosphere, temperature, or pressure. This can be collected from at least one of a network of aircraft 10, 14 operating in the nearby region 82, sensors 40 on the aircraft 10, or a ground station 64 in communication with the aircraft 10, 14, as well as any other source of weather information.

At 138, at least one vortex 86 with a vortex magnitude can be predicted to be encountered by the current flight path. The routing module 36 of the flight management system 32 can utilize information received at the receiving module 34 to enter the information into a model. The model can be used to predict the vortex magnitude, as well as path of the vortex 86. A prediction can be a determined vortex magnitude and position for the vortex 86 over time, as determined by the model. Additionally, at 138, predicting can comprise utilizing, via a routing module, such as the routing module 36 described herein, a 4D routing algorithm used to identify if the aircraft 14 will traverse the at least one vortex 86. More specifically, the routing module 36 can compare the flight path 84 of an aircraft 14 with the position and path of the vortex 86 to predict any intersection between the two.

Furthermore, the 4D routing algorithm or model can account for at least one of the vortex 86 based on weather conditions or the rate of dissipation of the vortex 86 through turbulence in the atmosphere, as well as determine vortex magnitude, which can be over time.

At 140, the flight management system 32 or the routing module can compare the vortex magnitude to a predetermined threshold for the aircraft to determine or indicate if the vortex magnitude interferes with the current flight path. Interfering can be encountering the vortex 86 along a current flight path, which may interrupt or generate turbulence for the aircraft 14. In one example, the predetermined threshold can be predetermined for the specific aircraft based upon current flight information, such as aircraft size, speed, weight, or mass, for example. At 142, the flight management system 32, or the routing module 36, can determine if the vortex magnitude satisfies the predetermined threshold based on the comparing between the two.

At 144, the method 130 can include automatically initiating at least one of an advisory alert on the flight management system 32 of the aircraft 14 or displaying on an aircraft flight display 44 a suggested alternative flight path if the vortex magnitude satisfies the predetermined threshold. Additionally, at 144, the advisory alert can indicate the time of the aircraft's 14 traversal of the vortex 86. Furthermore, the suggested alternative flight path can include the Strategic Lateral Offset Procedure 110, which can define a portion of the suggested alternative flight path. Further yet, the displaying a suggested alternative flight path can include determining a new flight path to avoid the at least one vortex 86. Such a new flight path can be at a different altitude that the current flight path, for example. Additionally, the new flight path can be automatically negotiated with Air Traffic Control 68.

It should be appreciated that the concepts discussed herein provide for a system and method for used to model and record the positions, paths, and intensities of the wake turbulence vortices generated by the aircraft moving through an airspace. Such models can be communicated over a communication network in order to update flight paths in order to avoid encounters with the vortex as necessary. Such modelling can be used to improve overall safety and efficiency of flight operations. Furthermore, overall flight traffic management can be improved. Modelling the vortex can reduce or eliminate the spacing requirements between aircraft currently utilized, which can provide for an overall increase in air traffic, which can provide for improved efficiency at airports. Furthermore, determining the magnitude or intensity of the vortex can provide for determining whether avoidance is even necessary, which can reduce the overall aircraft spacing or variation of flight paths, leading to improved efficiency, as well as reduced fuel consumption for individual aircrafts and reduced total flight time.

Additionally, it should be appreciated that the systems and methods as described herein can be applied to Air Traffic Control (ATC) or a ground control system. More specifically, a flight management system, such as the flight management system 32 of FIGS. 2-3 can be utilized by ATC or ground control. Alternatively, ATC could use another similar management system, such as a traffic management system, different from that of the flight management system of an aircraft. Such a traffic management system could communicatively interface with the flight management system of aircraft in communication with ATC. The calculations and analysis performed by the traffic management system would be for all air traffic within a region and overseen by ATC, as well as provided to the aircraft flight management system to use as inputs for flight or routing. In this way, the ATC can provide for distributed processing and using the aircraft flight management system to do routing or flight planning on board. Therefore, it should be appreciated that a flight management system can be used interchangeably with a traffic management system centralized to the ATC, and should be understood that the language is simply to distinguish between a system centralized on an aircraft or at air traffic control, while the two can be separate systems in communication with one another.

The flight management system can include the receiving module, the routing module, and/or the advisory module as described herein, or such elements can be remote of the flight management system. The receiving module can provide for bidirectional communication between ATC and other sources, such as aircraft. More specifically, a sensor, such as the sensor 40 of FIG. 2, can be used to make measurements and communicated to ATC via the receiving module. The routing module can provide for storing, mapping, predicting, or otherwise determining a flight path or 4D position of an aircraft or a vortex. The advisory module can provide for alerting or re-routing one or more aircraft in order to avoid wake turbulence while improving overall flight traffic and efficiency. Such a flight management system for ATC can provide for control of a set of aircraft or aircraft systems for a given airspace, region, or airport.

The aircraft, ATC, ground stations, towers, or other communication elements within a nearby region 82 can provide measurements to the flight management system for ATC. For example, local aircraft can provide information and measurements specific to the aircraft or the local weather. More specifically, the aircraft can transmit such information to ATC such as aircraft speed, size, or lift, in order to determine a vortex magnitude. Additionally, the aircraft can transmit 4D position so that a position of the vortex can be mapped. Further still, the aircraft or other local services can provide local weather information, such as wind speed, temperature, or turbulence. With such information, the flight management system for Air Traffic Control can map a position and a magnitude of the vortex, as well as the flight path and dissipation of the vortex. Additionally, this information can be overlaid with flight paths for incoming or leaving aircraft to determine any potential intersection with an aircraft and a vortex via mapping of the flight path of the aircraft and the flight path of the vortex.

With such a mapping, the ATC can update flight paths or flight plans such that minimal crossing or intersection with created vortices occurs within a given airspace or region. Such minimizing of the encountering of the vortices can provide for safer flights and more comfortable flights with reduced turbulence. Additionally, overall flight traffic can be improved and increased, which can be used to reduce overall fuel consumption and costs, as well as flight times.

The aspects of the present disclosure provide a system and method for monitoring, reporting, and avoiding wake turbulence vortices in aircraft. A network of aircraft, ground control, Air Traffic Control, or any other system capable of communication can record data related to the wake turbulence vortices, and provide such information related thereto to other aircraft in the area in order to avoid such wake turbulence vortices and improve overall air traffic efficiency. The technical effect is that the aspects described herein enable the recording, modelling, indicating, and avoiding of wake turbulence vortices in aircraft. One advantage that can be realized is improved overall safety, as well as increased total air traffic. In addition, this increase in efficiency for air traffic can provide for improved specific fuel consumption, lesser delays, and improved travel times. Furthermore, the aspects of the disclosure can provide for reduced turbulence for flights, which provides for increased overall ride comfort and experience.

To the extent not already described, the different features and structures of the various embodiments of the present disclosure may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While aspects of the present disclosure have been specifically described in connection with certain specific embodiments thereof, it is to be understood that this is by way of illustration and not of limitation. Reasonable variation and modification are possible within the scope of the forgoing disclosure and drawings without departing from the spirit of the present disclosure that is defined in the appended claims.

Further aspects of the invention are provided by the subject matter of the following clauses:

1. A method of updating flight calculations, the method comprising flying an aircraft along a current flight path, automatically collecting aircraft traffic information including at least one of aircraft position, type, mass, or mass category from at least one of a network of aircraft operating in a nearby region or a ground station, automatically collecting real-time weather data, predicting at least one vortex with a vortex magnitude to be encountered by the current flight path, comparing the vortex magnitude to a predetermined threshold for the aircraft, determine if the vortex magnitude satisfies the predetermined threshold based on the comparing to indicate the vortex magnitude interferes with the current flight path, and automatically initiating at least one of an advisory alert on a system of the aircraft or displaying, on an aircraft flight display, a suggested alternative flight path if the vortex magnitude satisfies the predetermined threshold.

2. The method of any preceding clause wherein the predicting comprises utilizing, via a routing module, a 4D routing algorithm to identify if the aircraft will traverse the at least one vortex.

3. The method of any preceding clause wherein the advisory alert indicates a time of traversal.

4. The method of any preceding clause wherein the automatically collecting real-time weather data includes at least one of wind direction, turbulence levels, temperature, or pressure from at least one of the network of aircraft operating in the nearby region, sensors on the aircraft, or the ground station.

5. The method of any preceding clause wherein the 4D routing algorithm accounts for at least one of the vortex based on weather conditions or rate of dissipation of the vortex through turbulence.

6. The method of any preceding clause wherein the displaying the suggested alternative flight path further comprises determining a Strategic Lateral Offset Procedure, which defines a portion of the suggested alternative flight path.

7. The method of any preceding clause wherein the displaying the suggested alternative flight path further comprises determining a new flight path to avoid the at least one vortex.

8. The method of any preceding clause wherein the new flight path is at a different altitude from the current flight path.

9. The method of any preceding clause wherein the predicting, comparing, determining, and automatically initiating is performed by Air Traffic Control.

10. A flight management system, comprising a receiving module configured to receive real-time weather data and configured to receive aircraft traffic information including at least one of aircraft type, mass, or mass category from at least one of a network of aircraft operating in a nearby region or a ground station, a routing module for predicting at least one vortex with a vortex magnitude to be encountered by a current flight path of an aircraft based on the real-time weather data and the air traffic information and determining if the vortex magnitude satisfies a predetermined threshold, and an advisory module configured to provide a display output based on the determining including at least one of an advisory alert on a system of the aircraft or displaying, on an aircraft flight display, a suggested alternative flight path.

11. The flight management system of any preceding clause wherein the aircraft traffic information further includes aircraft four-dimensional position.

12. The flight management system of any preceding clause wherein the nearby region is within 100 miles of the current flight path.

13. The flight management system of any preceding clause wherein the receiving module is configured to receive the real-time weather data directly from the network of aircraft or from the ground station.

14. The flight management system of any preceding clause, further comprising at least one sensor on the aircraft and wherein the receiving module is configured to receive the real-time weather data from at least one sensor on the aircraft.

15. The flight management system of any preceding clause wherein the real-time weather data is weighted based on at least one of time, distance, or regional effect.

16. The flight management system of any preceding clause wherein the receiving module is further configured to automatically query for the real-time weather data.

17. The flight management system of any preceding clause wherein the routing module utilizes a 4D routing algorithm to identify if the aircraft will traverse the at least one vortex.

18. The flight management system of any preceding clause, further comprising a cockpit display and wherein the advisory alert indicates a time of traversal on the cockpit display.

19. The flight management system of any preceding clause wherein the real-time weather data includes at least one of wind direction, turbulence levels, temperature, or pressure and the 4D routing algorithm accounts for at least one at least one of travel of the vortex based on weather conditions or rate of dissipation of the vortex through turbulence.

20. The flight management system of any preceding clause wherein the displaying the suggested alternative flight path further comprises determining a new flight path or Strategic Lateral Offset Procedure.

21. A method of optimizing a system of flights, the method comprising automatically collecting aircraft traffic information from at least one aircraft including at least one of aircraft position, type, mass, or mass category in a region, automatically collecting real-time weather data, predicting at least one vortex with a vortex magnitude to be encountered by the at least one aircraft, comparing the vortex magnitude to a predetermined threshold for the at least one aircraft to determine if the vortex magnitude satisfies the predetermined threshold, and updating a flight path of the at least one aircraft if the vortex magnitude exceeds the predetermined threshold.

22. The method of any preceding clause wherein the method is performed by air traffic control.

23. The method of any preceding clause wherein the at least one aircraft includes a set of aircraft existing within the region.

24. The method of any preceding clause wherein predicting at least one vortex is accomplished with a management system at air traffic control.

25. The method of any preceding clause wherein the management system bidirectionally communicates with a set of aircraft within the region.

What is claimed is:

1. A method of updating flight calculations, the method comprising:
   automatically collecting aircraft traffic information including at least one of aircraft position, type, speed, mass, or mass category from at least one of a network of aircraft operating in a nearby region or a ground station;
   automatically collecting real-time weather data;
   predicting at least one vortex with a vortex magnitude to be encountered by a current flight path for an aircraft based on the automatically collected aircraft traffic information and the automatically collected real-time weather data;
   comparing the vortex magnitude to a predetermined threshold for the aircraft, wherein the predetermined threshold is based at least in part upon a speed of the aircraft and a vortex magnitude deemed too great for the aircraft to traverse;
   determine if the vortex magnitude satisfies the predetermined threshold based on the comparing to indicate the vortex magnitude interferes with the current flight path; and
   automatically displaying, on an aircraft flight display, a suggested alternative flight path if the vortex magnitude satisfies the predetermined threshold, wherein the displaying the suggested alternative flight path further comprises displaying a time of traversal of the suggested alternative flight path and determining a Strategic Lateral Offset Procedure, which defines a portion of the suggested alternative flight path;
   updating a flight path of the aircraft when the vortex magnitude exceeds the predetermined threshold.

2. The method of claim 1 wherein the predicting comprises utilizing, via a routing module, a 4D routing algorithm to identify if the aircraft will traverse the at least one vortex.

3. The method of claim 2 wherein the automatically collecting real-time weather data includes at least one of wind direction, turbulence levels, temperature, or pressure from at least one of the network of aircraft operating in the nearby region, sensors on the aircraft, or the ground station.

4. The method of claim 3 wherein the 4D routing algorithm accounts for at least one of the vortex based on weather conditions or rate of dissipation of the vortex through turbulence.

5. The method of claim 1 wherein the displaying the suggested alternative flight path further comprises determining a new flight path to avoid the at least one vortex.

6. The method of claim 5 wherein the new flight path is at a different altitude from the current flight path.

7. The method of claim 1 wherein the predicting, comparing, determining, and automatically initiating is performed by Air Traffic Control.

8. A flight management system, comprising:
   a receiving module configured to receive real-time weather data and configured to receive aircraft traffic information including at least one of aircraft type, speed, mass, or mass category from at least one of a network of aircraft operating in a nearby region or a ground station;
   a routing module for predicting at least one vortex with a vortex magnitude to be encountered by a current flight path of an aircraft based on the real-time weather data and the air traffic information and determining if the vortex magnitude satisfies a predetermined threshold, the predetermined threshold based at least in part upon a speed of the aircraft and a vortex magnitude deemed too great for the aircraft to traverse; and
   an advisory module configured to provide a display output based on the determining including at least one of an advisory alert on a system of the aircraft or displaying, on an aircraft flight display, a suggested alternative flight path, wherein the displaying the suggested alternative flight path further comprises displaying a time of traversal of the suggested alternative flight path and determining a Strategic Lateral Offset Procedure, which defines a portion of the suggested alternative flight path;
   updating a flight path of the aircraft when the vortex magnitude exceeds the predetermined threshold.

9. The flight management system of claim 8 wherein the aircraft traffic information further includes aircraft four-dimensional position.

10. The flight management system of claim 8 wherein the nearby region is within 100 miles of the current flight path.

11. The flight management system of claim 8 wherein the receiving module is configured to receive the real-time weather data directly from the network of aircraft or from the ground station.

12. The flight management system of claim 8, further comprising at least one sensor on the aircraft and wherein the receiving module is configured to receive the real-time weather data from at least one sensor on the aircraft.

13. The flight management system of claim 8 wherein the real-time weather data is weighted based on at least one of time, distance, or regional effect.

14. The flight management system of claim 8 wherein the receiving module is further configured to automatically query for the real-time weather data.

15. The flight management system of claim 8 wherein the routing module utilizes a 4D routing algorithm to identify if the aircraft will traverse the at least one vortex.

16. The flight management system of claim 15, further comprising a cockpit display and wherein the advisory alert indicates a time of traversal on the cockpit display.

17. The flight management system of claim 15 wherein the real-time weather data includes at least one of wind direction, turbulence levels, temperature, or pressure and the 4D routing algorithm accounts for at least one at least one of travel of the vortex based on weather conditions or rate of dissipation of the vortex through turbulence.

18. A method of optimizing a system of flights, the method comprising:
   automatically collecting aircraft traffic information from at least one aircraft including at least one of aircraft position, type, speed, mass, or mass category in a region;

automatically collecting real-time weather data;
predicting at least one vortex with a vortex magnitude to be encountered by the at least one aircraft based on the automatically collected aircraft traffic information and the automatically collected real-time weather data;
comparing the vortex magnitude to a predetermined threshold for the at least one aircraft to determine if the vortex magnitude satisfies the predetermined threshold, wherein the predetermined threshold at least in part upon a speed of the aircraft and a vortex magnitude deemed too great for the aircraft to traverse;
automatically displaying, on an aircraft flight display, a suggested alternative flight path if the vortex magnitude satisfies the predetermined threshold, wherein the displaying the suggested alternative flight path further comprises displaying a time of traversal of the suggested alternative flight path and determining a Strategic Lateral Offset Procedure, which defines a portion of the suggested alternative flight path; and
updating a flight path of the at least one aircraft when the vortex magnitude exceeds the predetermined threshold.

19. The method of claim 18 wherein the method is performed by air traffic control.

20. The method of claim 18 wherein the at least one aircraft includes a set of aircraft existing within the region.

21. The method of claim 18 wherein predicting at least one vortex is accomplished with a management system at air traffic control.

22. The method of claim 21 wherein the management system bidirectionally communicates with a set of aircraft within the region.

* * * * *